United States Patent [19]

Marthaler

[11] Patent Number: 5,755,350
[45] Date of Patent: May 26, 1998

[54] STORAGE CONTAINER ASSEMBLY HAVING SINGLE-FINGER-ACTUATABLE DOOR LATCH MECHANISM

[75] Inventor: Robert H. Marthaler, Elmhurst, Ill.

[73] Assignee: Acco Brands, Inc., Lincolnshire, Ill.

[21] Appl. No.: 667,565

[22] Filed: Jun. 21, 1996

[51] Int. Cl.$^6$ .................................................. B65D 45/16
[52] U.S. Cl. .................... 220/324; 220/337; 220/335; 292/87; 292/DIG. 38
[58] Field of Search ........................... 220/324, 326, 220/337, 338, 339, 315, 335, 4.21, 4.22, 4.24, 786, 784, 788, 318; 292/DIG. 38, DIG. 11, 87; 190/121

[56] References Cited

U.S. PATENT DOCUMENTS

| | | | |
|---|---|---|---|
| 2,605,926 | 8/1952 | Casey | 220/338 |
| 3,524,564 | 8/1970 | Schurman | 220/324 X |
| 3,546,752 | 12/1970 | Sargent | 220/324 |
| 4,729,475 | 3/1988 | Kurkjian et al. | 220/338 X |
| 4,789,078 | 12/1988 | Miller et al. | 220/335 |
| 4,790,579 | 12/1988 | Maxwell et al. | 292/DIG. 38 X |
| 4,848,574 | 7/1989 | Murphy et al. | 220/335 X |
| 4,901,882 | 2/1990 | Goncalves | 220/324 |
| 4,936,454 | 6/1990 | Wang | 220/335 X |
| 5,062,671 | 11/1991 | Goetz et al. | 292/DIG. 38 X |
| 5,131,558 | 7/1992 | Hiromori | 220/338 X |
| 5,139,165 | 8/1992 | Hara | 220/339 |
| 5,358,291 | 10/1994 | Malmanger et al. | 292/DIG. 38 X |
| 5,638,839 | 6/1997 | Montoli | 220/335 X |

FOREIGN PATENT DOCUMENTS

2443  6/1979  European Pat. Off. ... 292/DIG. 38 X

Primary Examiner—Allan N. Shoap
Assistant Examiner—Nathan Newhouse
Attorney, Agent, or Firm—Pennie & Edmonds LLP

[57] ABSTRACT

A storage container assembly including a housing, a door pivotally connected to the housing, and an elastomeric lock handle removably connected to the door. The lock handle includes a groove having an entrance. The groove is operable to selectively engage or disengage a tongue extending outwardly from the housing. In the exemplary embodiment, the tongue includes an enlarged nub operable to be received in a complementary cavity of the groove when the door is closed. A restricted passage in the groove between the entrance and the cavity maintains the nub within the cavity until the door is intentionally opened. This inexpensive and simple-to-assemble arrangement allows the door to be easily and quietly opened or closed with minimal force by one hand or even a single finger.

15 Claims, 12 Drawing Sheets

FIG. 26

STORAGE CONTAINER ASSEMBLY HAVING SINGLE-FINGER-ACTUATABLE DOOR LATCH MECHANISM

FIELD OF THE INVENTION

The present invention relates generally to door latch mechanisms, more particularly, to door latch mechanisms adapted for storage containers of electronic media such as optical compact discs, computer software diskettes, audio cassette tapes, and the like.

BACKGROUND ART OF THE INVENTION

Electronic media (such as optical compact discs, computer software diskettes, audio cassette tapes, and the like) are typically stored in protective containers when not in use. Such containers are useful for protecting the electronic media from dust, moisture, impacts, etc. which can damage or shorten the life of such electronic media.

Known storage containers having door latch mechanisms are shown, for example, in U.S. Pat. No. 3,688,942 issued to Mitchell et al. on Sep. 5, 1972, U.S. Pat. No. 4,647,118 issued to Kamperman on Mar. 3, 1987, U.S. Pat. No. 4,917,413 issued to Jason et al. on Apr. 17, 1990, U.S. Pat. No. 5,050,734 issued to Chen on Sep. 24, 1991, U.S. Pat. No. 5,121,952 issued to Jason on Jun. 16, 1992, and U.S. Pat. No. 5,322,178 issued to Foos on Jun. 21, 1994.

When people operate devices, such as personal computers having insertable disc drives or moving vehicles having audio cassette or compact disc players, they often desire to retrieve electronic media from such protective storage containers for work or enjoyment while still performing their primary manual task such as typing or driving. In providing a latch mechanism for a door of such a storage container which is manually released to open, but which mechanism latches on impact when the door is slammed shut, it is necessary that the latch mechanism exhibit a snap action whereby it will readily release in response to a predetermined pull force.

The doors of presently available storage containers are often latched too tightly to permit opening with one just hand. In such instances, the operator must completely interrupt or at least divert significant attention away from the performance of his or her primary task. This is because both hands are required to prevent the storage container from moving away or tipping over while simultaneously manually opening the door. Such interruptions or diversions may adversely diminish the person's productivity or safety.

The present invention is directed to overcoming one or more of the problems as set forth above.

SUMMARY OF THE INVENTION

In one aspect of the present invention, a storage container assembly is disclosed comprising a housing, a door pivotally connected to the housing, and an elastomeric lock handle removably connected to the door. The housing defines a storage chamber and has a frame defining an opening to the storage chamber. The frame has a tongue extending outwardly therefrom. The door is pivotally movable between i) a closed position at which the door abuts the frame and covers the opening of the storage chamber and ii) an opened position at which the door is pivotally displaced from the frame and uncovers the opening of the storage chamber. The lock handle defines a groove operable to selectively i) engage the tongue of the housing when the door and lock handle are pivotally moved to their closed positions and ii) disengage the tongue when the door and lock handle are pivotally moved towards their opened positions.

The storage container assembly of the present invention is lightweight and easy to assemble without the use of tools or additional fasteners. The door of the storage container assembly can be easily and quietly opened or closed with a light force applied by just one hand or as little as one finger.

DETAILED DESCRIPTION OF THE INVENTION

Referring to FIGS. 1-26, wherein similar reference characters designate similar elements or features throughout the figures, there is shown an exemplary embodiment of the storage container assembly of the present invention.

Figure 1:
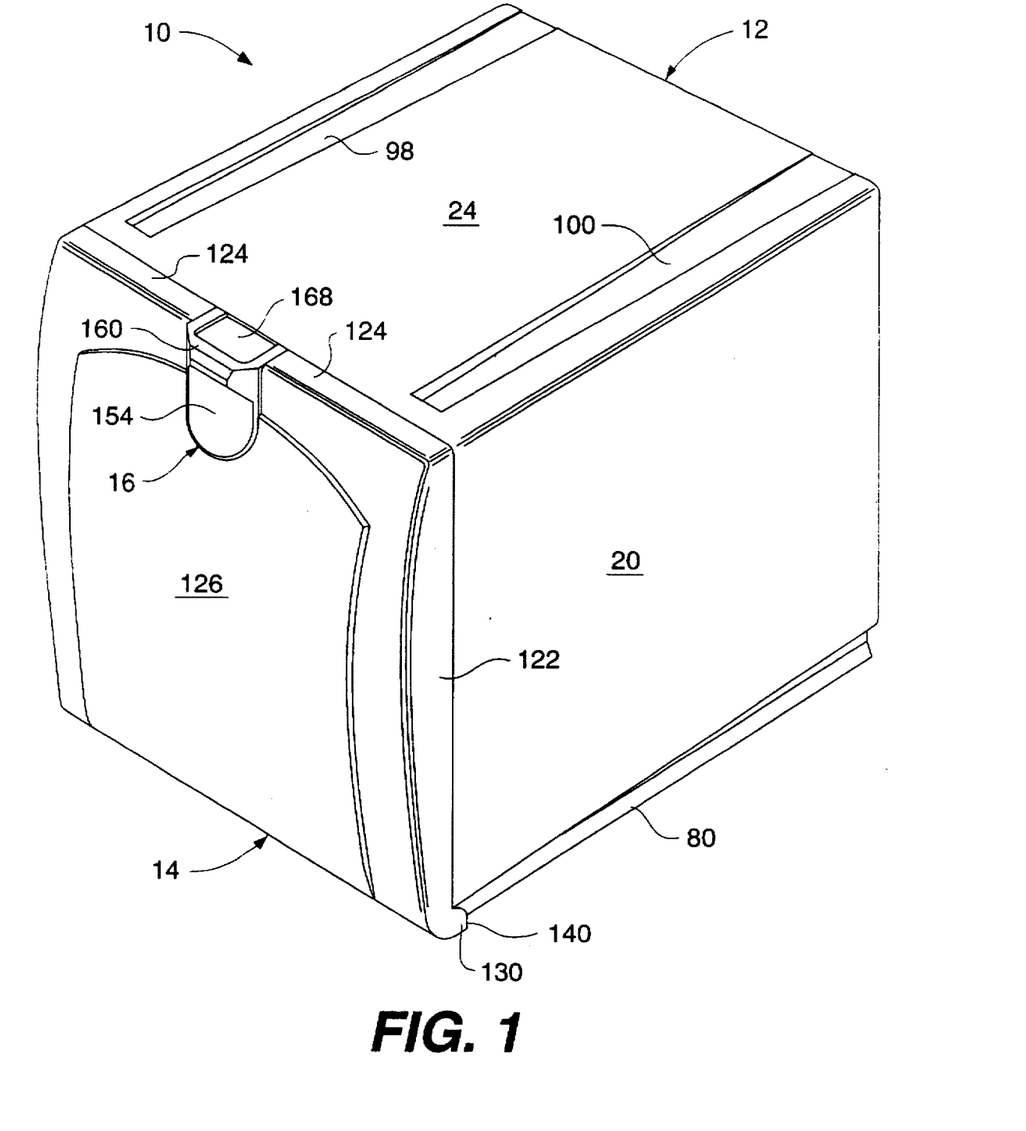
FIG. 1 is a perspective view of a latchable mechanism of the present invention adapted for and shown incorporated in an electronic media storage container assembly.
Figure 2:
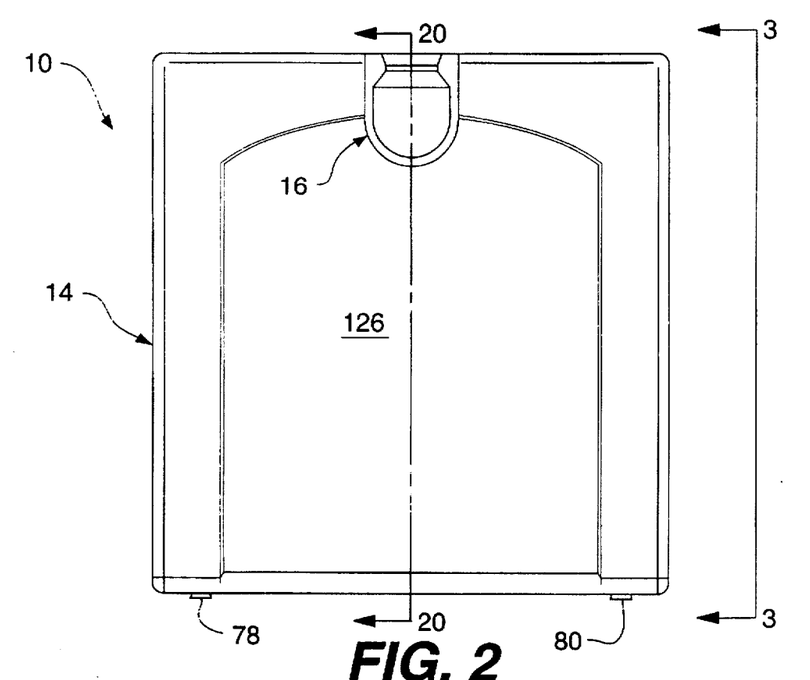
FIG. 2 is a front elevational view of the storage container assembly shown in FIG. 1.
Figure 3:
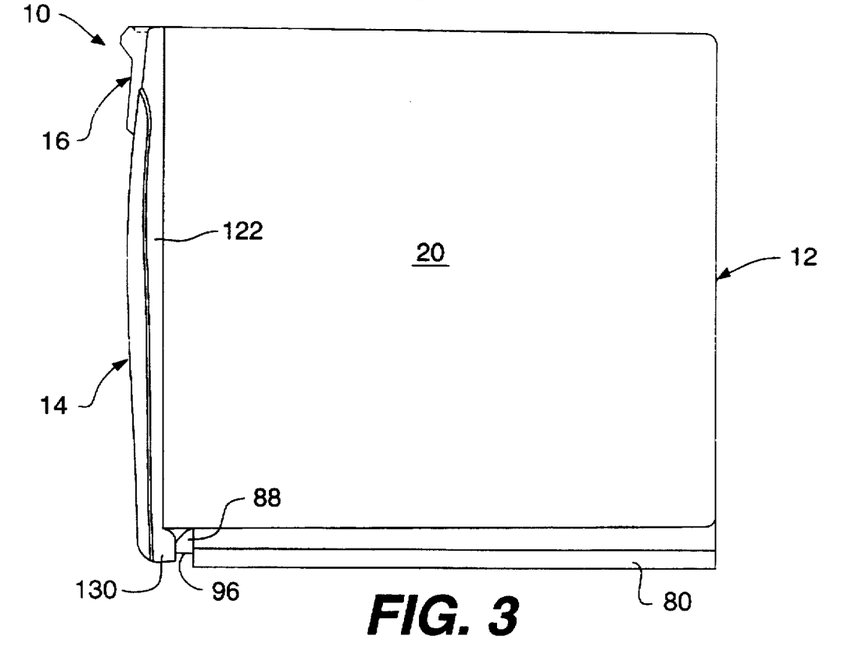
FIG. 3 is a side elevational view of the storage container assembly taken along line 3—3 of FIG. 2.

Referring to FIGS. 1-3, the storage container assembly 10 includes a housing 12, a door 14 pivotally connected to the housing 12, and a lock handle 16 releasably connected to the door 14 by an interference fit.

The housing 12 and door 14 are each monolithic (i.e., one-piece) components. They are formed from a relatively-rigid high-impact-resistant thermoplastic polymer material which may be either opaque or transparent. Suitable materials for the housing 12 and door 14 include those selected from the group of acrylonitrile-butadiene-styrene (ABS), polystyrene, polymethyl methacrylate, high density polyethylene, and polycarbonate terephthalate. Such materials may be color impregnated as desired. The housing 12 and door 14 are each formed by any one of a number of conventional manufacturing processes such as injection molding, blow molding, thermo molding, or compression molding.

As shown in FIGS. 4-7, the housing 12 includes a pair of mutually spaced-apart vertical side walls 18,20, a bottom wall 22 extending horizontally between the side walls 18,20, a top wall 24 spaced from the bottom wall 22 and extending between the side walls 18,20, and a vertical rear wall 26 extending between both the side walls 18,20 and the top and bottom walls 24,22. The walls 18,20,22,24,26 collectively define a blind storage chamber 28 adapted for storing and retrieving one or more items. Each of the side walls 18,20 and the top and bottom walls 24,22 has a generally rectangular frame portion or flat front face 34. All of the frame portions 34 are located in an imaginary common plane and collectively constitute a frame 42 (FIG. 6) which defines an opening 44 (FIG. 25) to the storage chamber 28.

The inside surface of each side wall 18,20 has a plurality of mutually spaced-apart racks 46 each extending from the rear to the front of the storage chamber 28. Oppositely-facing pairs of racks 46 lying in a common horizontal plane are operable to support and store either individual items placed directly thereon or conventional slidable trays (not shown) placed thereon which are adapted for carrying such items.

Figure 4:
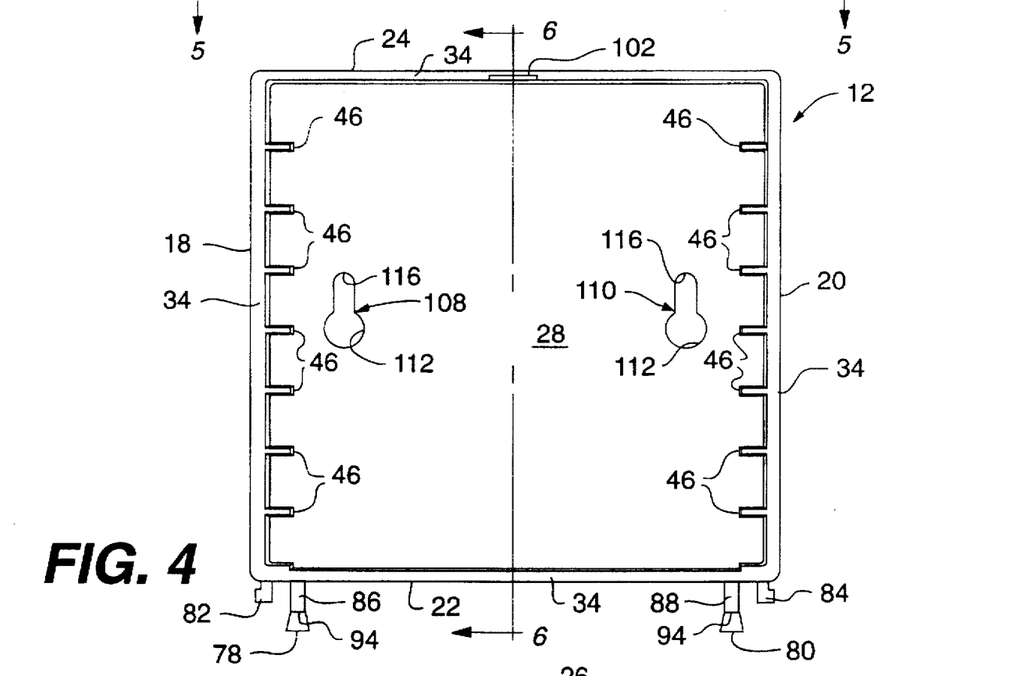
FIG. 4 is an isolated front elevational view of the housing shown in FIGS. 1-3.
Figure 25:
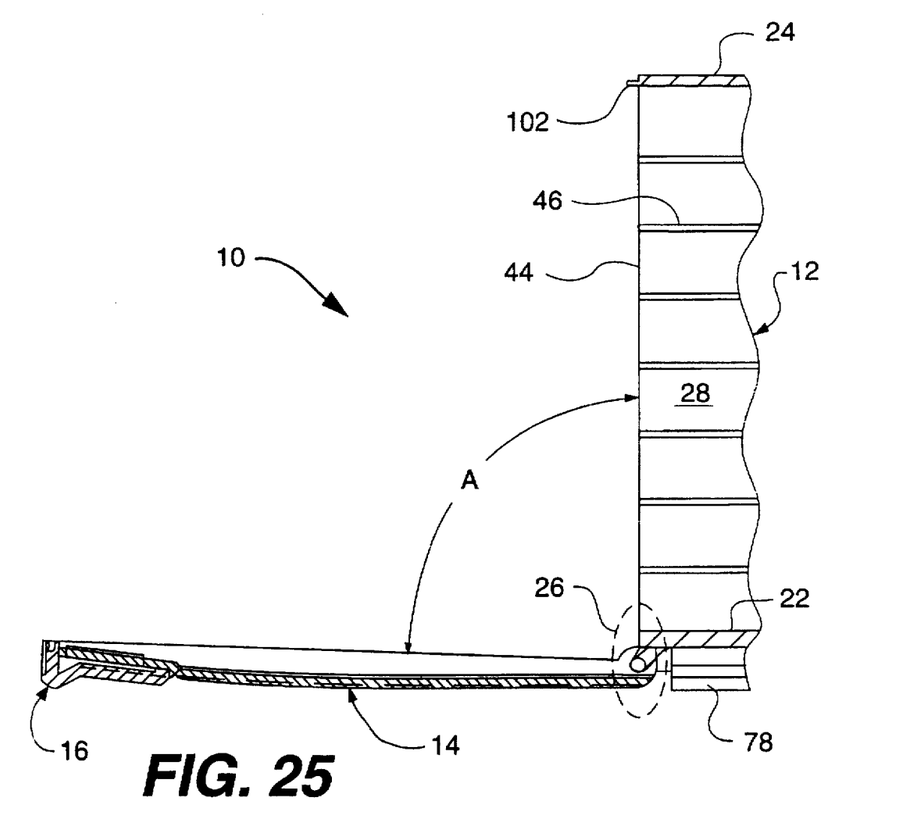
FIG. 25 is a cross-sectional partial view of the storage container assembly, similar to FIG. 20, but showing the door at its fully-opened position.

As shown in FIG. 4, the bottom wall 22 of the housing 12 includes a pair of mutually spaced-apart legs 78,80, a pair of integrally-formed mutually spaced-apart pivot pins 82,84 extending in opposite directions away from each other, and at least one stop 86,88 positioned between the pivot pins 82,84. In the embodiment shown, the legs 78,80 are shaped like continuous rails and extend from the rear of the housing 12 to substantially the front end thereof. As shown in FIG. 25, the legs 78,80 advantageously provide both stable support as well as vertical ground clearance for the opened door 14. Such clearance allows the opened door 14 to drop below and thereby fully expose the opening 44 of the storage chamber 28 so that items can even be stored and retrieved on the inside surface of the bottom wall 22.

Figure 26:
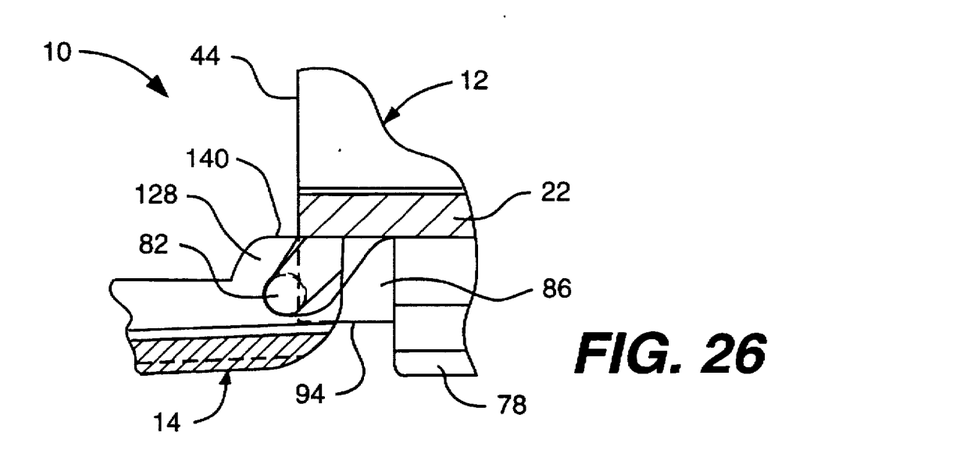
FIG. 26 is an enlarged partial view of the hinge mechanism taken within oval 26 of FIG. 25.

In the embodiment shown, a pair of mutually spaced-apart stops 86,88 are positioned between the pivot pins 82,84. Referring to FIGS. 20-21 and 25-26, each stop 86,88 is formed as a partial extension of the front end of a respective leg 78,80 and extend to the imaginary plane containing the frame portion 34 of the bottom wall 22. As shown in FIGS. 4 and 26, each stop 86,88 has a downwardly-facing abutment 94.

Figure 5:
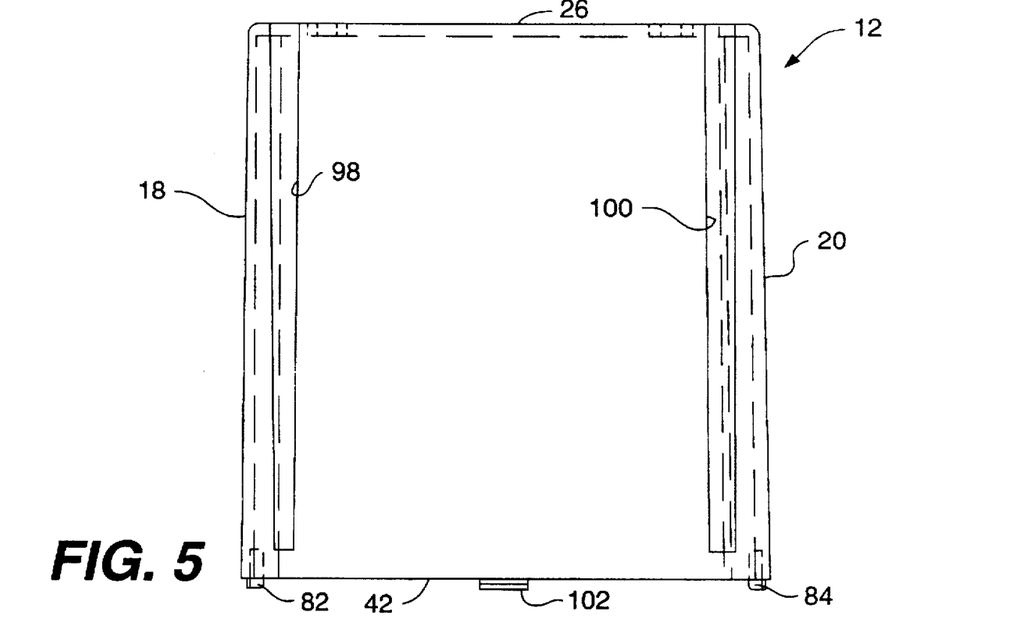
FIG. 5 is a top plan view of the housing taken along line 5—5 of FIG. 4.

As shown in FIGS. 1 and 5, the outside surface of the top wall 24 includes a pair of mutually spaced-apart and generally parallel open channels 98,100 extending from the rear to substantially the front of the housing 12. The pairs of legs 78,80 of the storage container assembly 10 may be optionally positioned or nested in the respective channels of another identical storage container assembly (not shown) to facilitate vertical stacking of multiple storage container assemblies. This advantageously minimizes the amount of horizontal space occupied by multiple storage container assemblies.

Figure 6:
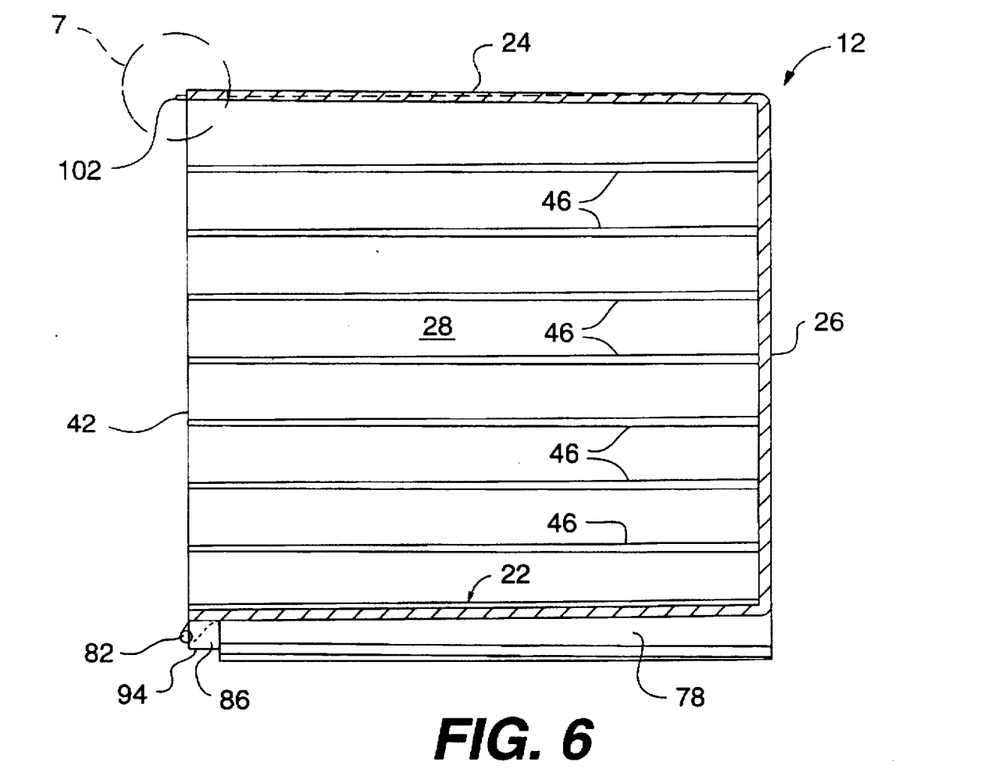
FIG. 6 is a cross-sectional view of the housing taken along line 6—6 of FIG. 4.
Figure 7:
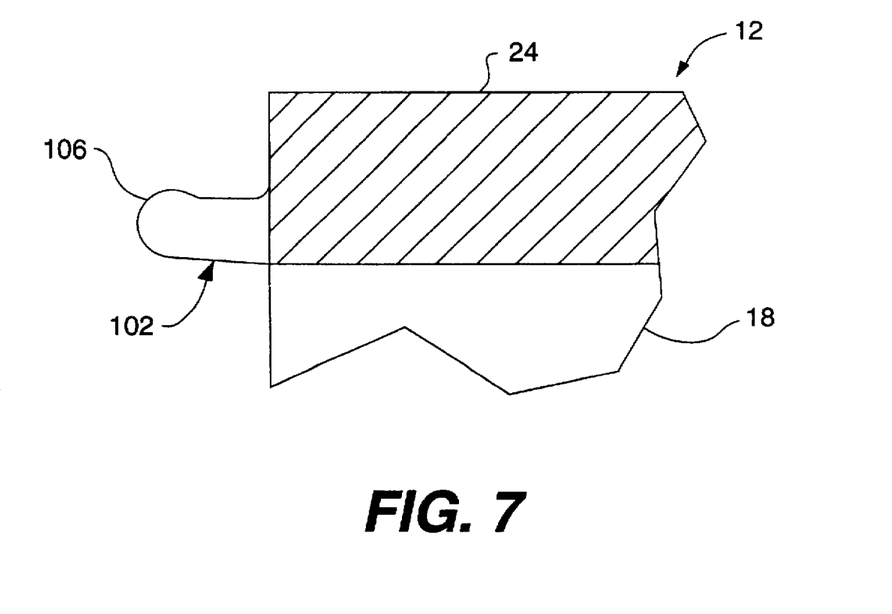
FIG. 7 is an enlarged partial view of the housing taken within circle 7 of FIG. 6.

As shown in FIGS. 6-7, the housing 12 further includes an elongated tongue 102 extending outwardly from the frame portion 34 of the top wall 24. The tongue 102 includes a free end portion having an enlarged nub 106 thereon.

As shown in FIG. 4, the rear wall 26 of the housing 12 includes a pair of mutually spaced-apart apertures 108,110. The apertures 108,110 are operable for optionally connecting the storage container assembly 10 to a wall or panel. Each aperture 108,110 includes a circular hole 112 and an elongated slot 116 of conventional construction for receipt of a wall fastener (not shown), such as a screw, nail, or hook.

Figure 13:
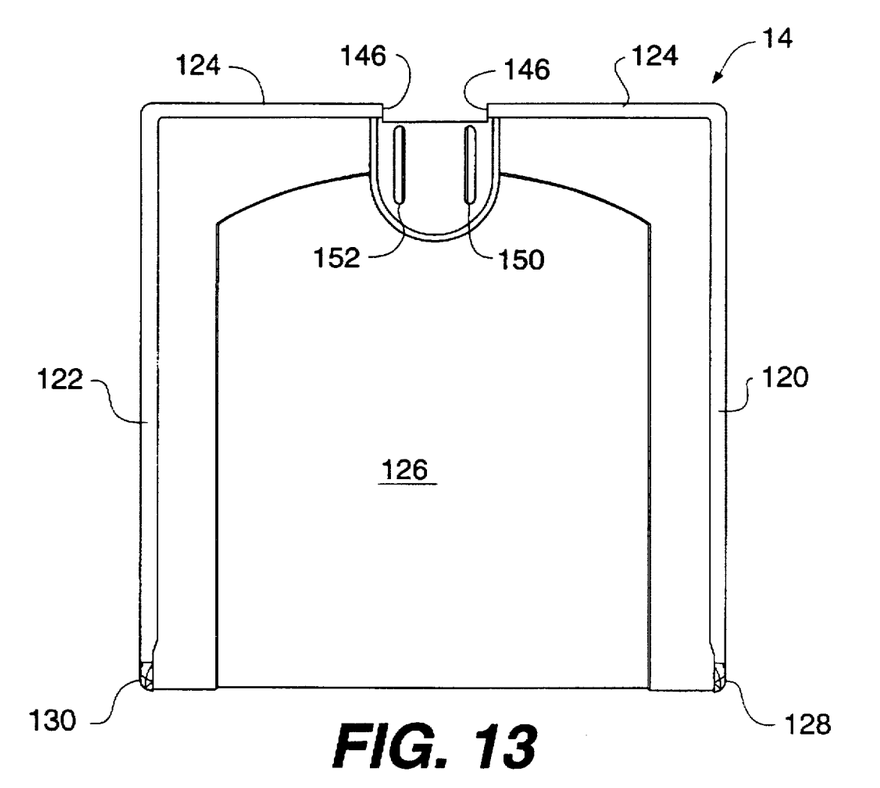
FIG. 13 is a rear elevational view of the door taken along line 13—13 of FIG. 12.
Figure 14:
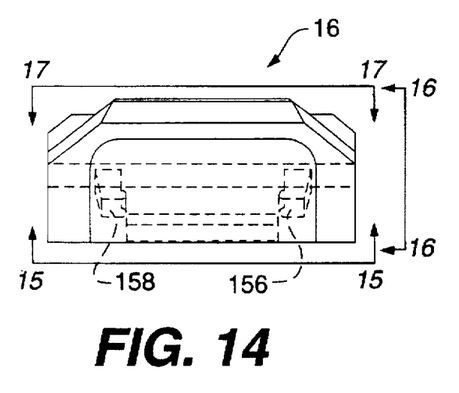
FIG. 14 is an isolated enlarged elevational view of the lock handle shown in FIGS. 1-3.
Figure 15:
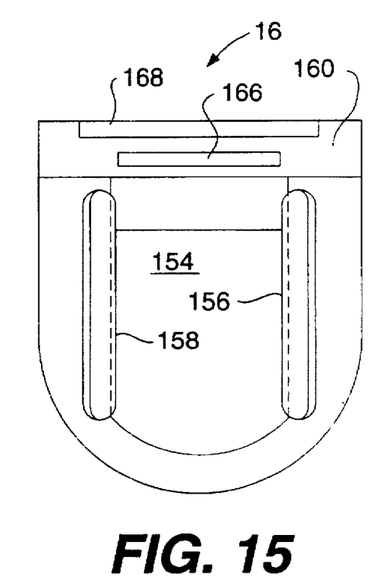
FIG. 15 is a bottom plan view of the lock handle taken along line 15—15 of FIG. 14.
Figure 16:
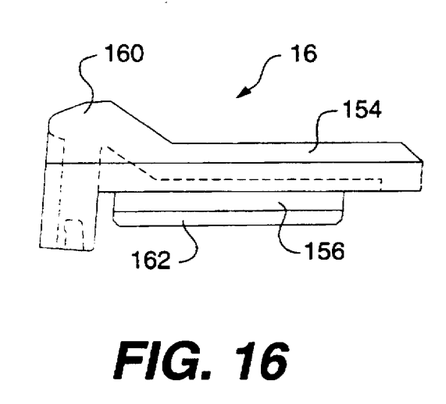
FIG. 16 is a side elevational view of the lock handle taken along line 16—16 of FIG. 14.
Figure 17:
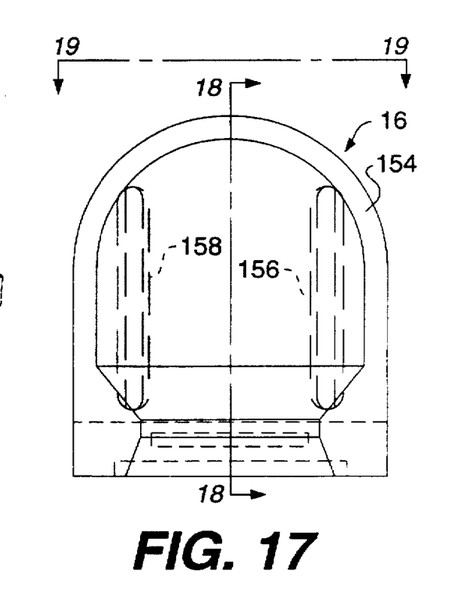
FIG. 17 is a top plan view of the lock handle taken along line 17—17 of FIG. 14.

As shown in FIGS. 20-21 and 25-26, the door 14 is pivotally movable between i) a closed position at which the door 14 abuts the frame 42 and covers the opening 44 of the storage chamber 28 and ii) an opened position at which the door 14 is pivotally displaced from the frame 42 and uncovers the opening 44 of the storage chamber 28. As shown in FIG. 13, the door 14 includes a pair of mutually spaced-apart side borders 120,122, a top border 124 connected between the side borders 120,122, and a central panel 126 extending between the side borders 120,122 and the top border 124.

Figures 9, 10, 11:
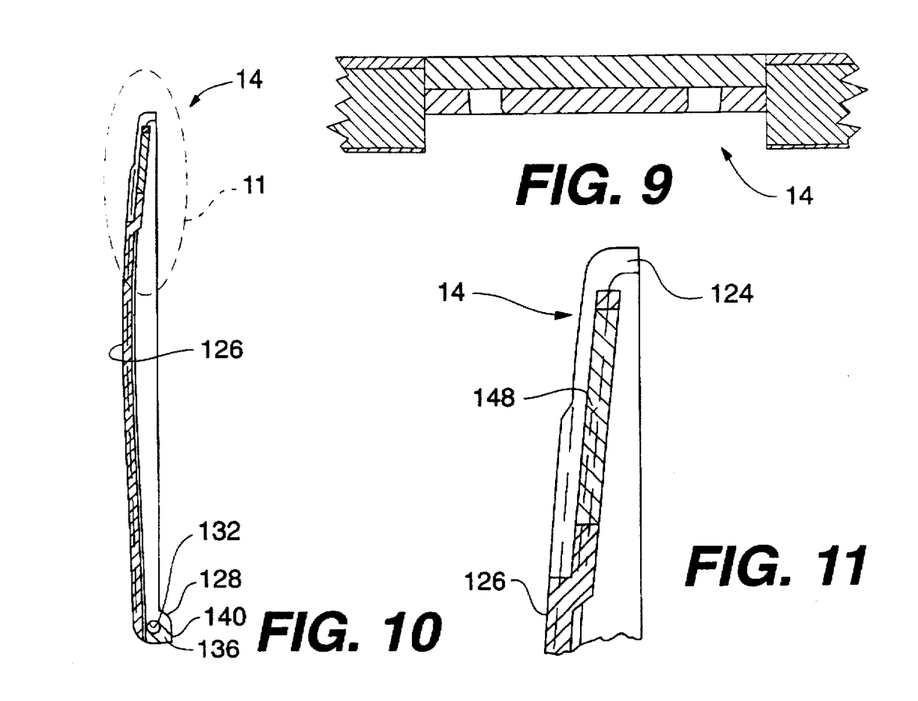
FIG. 9 is an enlarged cross-sectional partial view of the door taken along line 9—9 of FIG. 8.
FIG. 10 is a cross-sectional view of the door taken along line 10—10 of FIG. 8.
FIG. 11 is an enlarged partial view of the door taken within oval 11 of FIG. 10.
Figure 12:
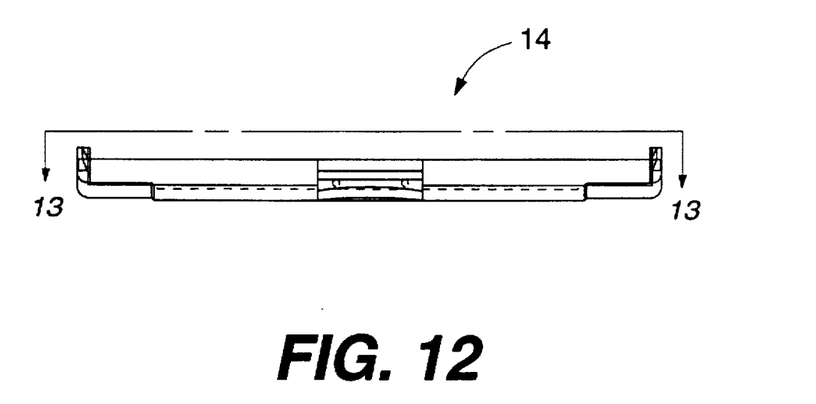
FIG. 12 is a top plan view of the door taken along line 12—12 of FIG. 8.

As shown in FIG. 13, each side border 120,122 of the door 14 includes an enlarged lug 128,130. The pair of lugs 128,130 are mutually spaced-apart and operable to elastically stretch from one another and over the pivot pins 82,84 during assembly of the door 14 to the housing 12. As shown in FIG. 10, each lug defines a blind bore 132 which slideably receives a respective pivot pin 82,84 of the housing 12. Each lug also includes a radially-extending furrow 136 and a shoulder 140. Each furrow 136 intersects the respective blind bore 132 and is advantageously operable to provide sufficient clearance for piloting the respective pivot pin 82,84 of the housing 12 into or out of the respective blind bore 132.

Figure 8:
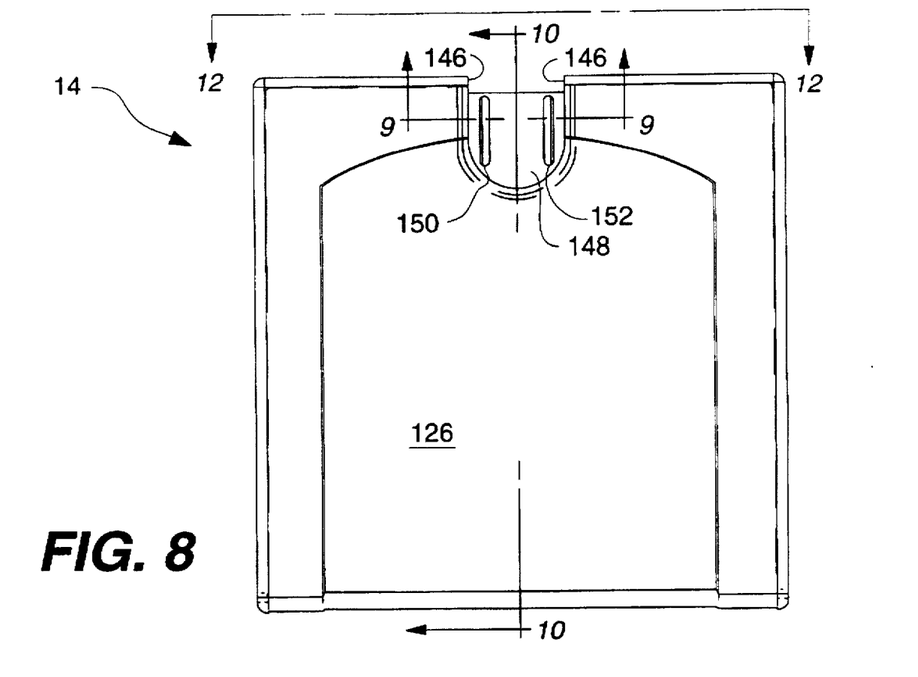
FIG. 8 is an isolated front elevational view of the door shown in FIGS. 1-3.

As shown in FIG. 8, the top border 124 of the door includes an elongated notch 146 located in the center thereof. The central panel 126 of the door 14 includes a recessed surface 148 intersecting the notch 146 and defining at least one slot 150,152. In the embodiment shown, the recessed surface 148 defines a pair of mutually spaced-apart elongated slots 150,152. Each slot 150,152 extends completely through the door 14. The recessed surface 148 advantageously pilots the lock handle 16 into the correct orientation and position as the lock handle 16 is assembled to the door 14. The entrance to each slot 150,152 may be widened or radiused to facilitate easier attachment of the lock handle 16 to the door 14.

The lock handle 16 is a generally solid monolithic component. The lock handle 16 is formed from a low durometer, low linear density, material selected from the group of elastomers, including natural and synthetic rubbers, and elastoplastics which may be either opaque or transparent. For example, a suitable material for the lock handle 16 is a fully vulcanized polyolefinic material comprising fully cured rubber particles dispersed throughout a matrix of thermoplastic material which is sold by the Monsanto Company of Akron, Ohio, U.S.A. under the trade name "SANTOPRENE". Alternatively, the lock handle 16 may be formed from silicon elastomers of formulations manufactured and sold by General Electric Company, Silicon Products Division, RTV Products Department, Waterford, N.Y., U.S.A. and the Dow Corning Corporation, Midland, Mich. U.S.A. and others. Such materials may be color impregnated as desired. The lock handle 16 is formed by any one of a number of conventional manufacturing processes, such as injection molding or compression molding.

As shown in FIGS. 14–19, the lock handle 16 includes a body 154, at least one rib 156,158 integrally formed with the body 154 and extending outwardly therefrom, and an angled head 160 integrally formed with the body 154. The body 154 of the lock handle 16 is adapted to be positioned on the recessed surface 148 of the door 14. The body 154 of the lock handle 16 has an external shape generally conforming to the shape of the recessed surface 148 of the door 14.

Figure 19:
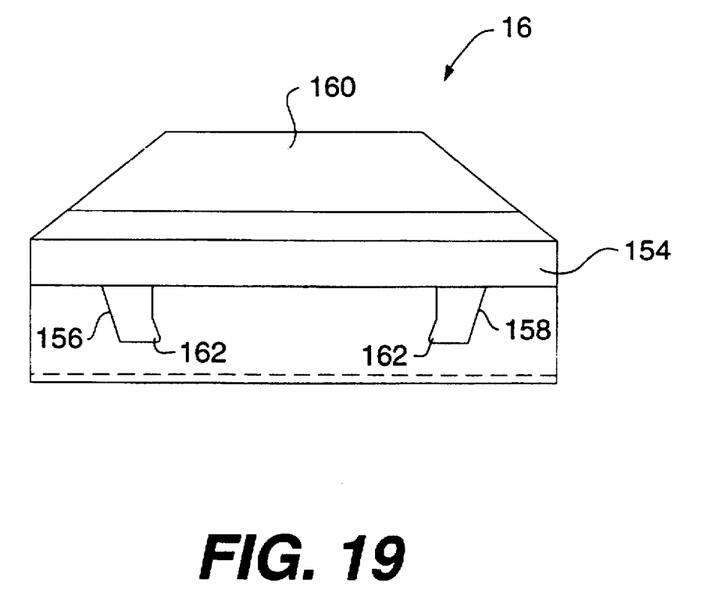
FIG. 19 is an enlarged elevational view of the lock handle taken along line 19—19 of FIG. 17.
Figure 22:
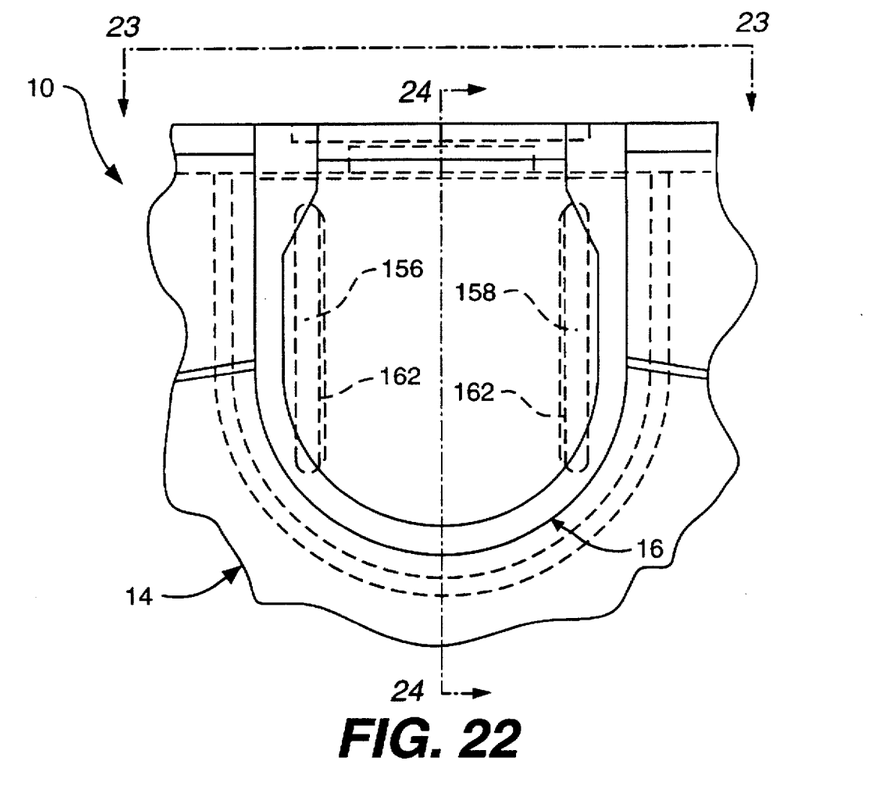
FIG. 22 is an enlarged elevational partial view of the latchable mechanism taken along line 22—22 of FIG. 20.
Figure 23:
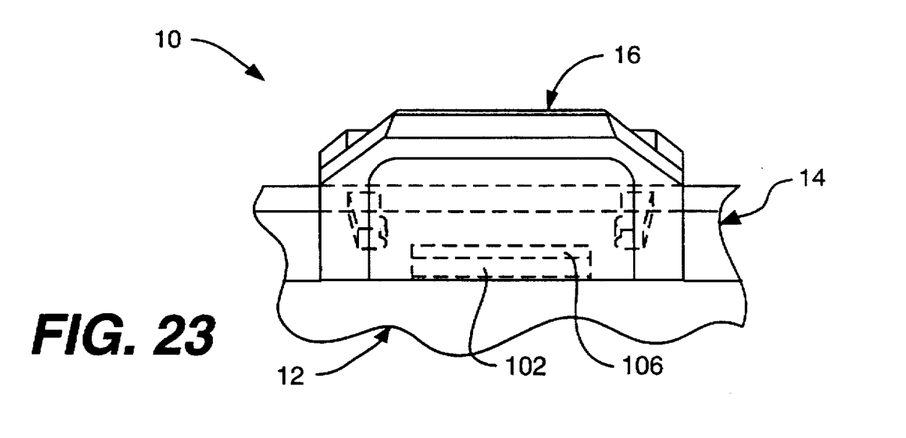
FIG. 23 is a top plan view of the latchable mechanism taken along line 23—23 of FIG. 22.
Figure 24:
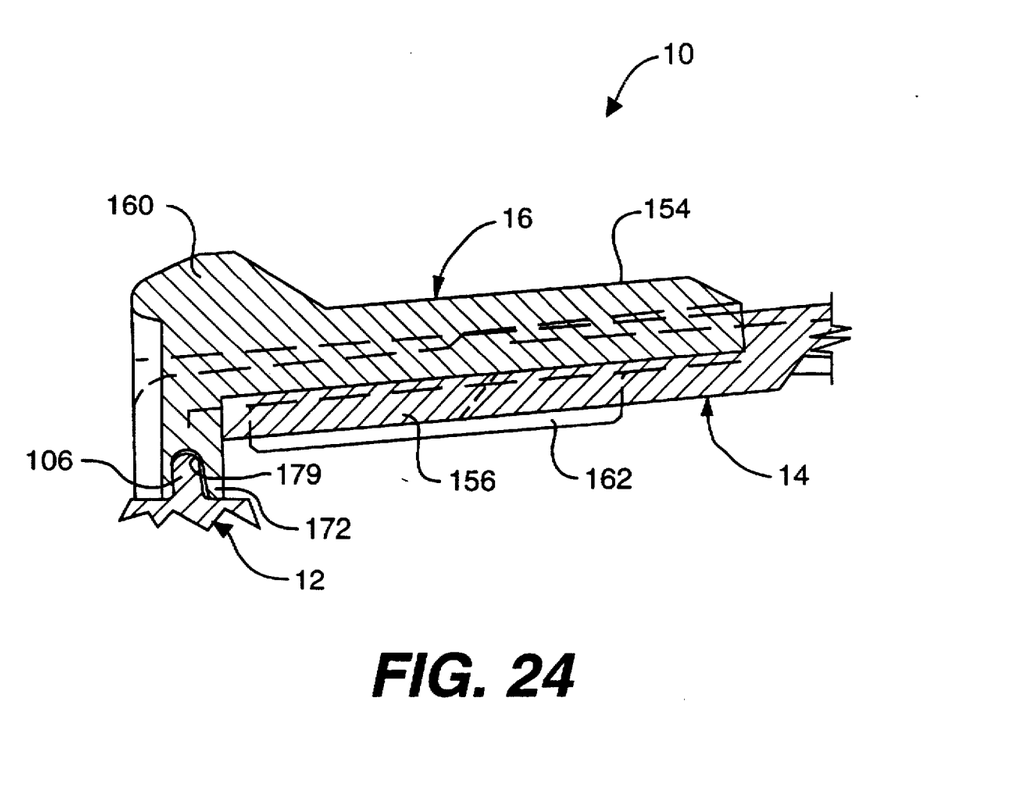
FIG. 24 is a cross-sectional view of the latchable mechanism taken along line 24—24 of FIG. 22.

In the embodiment shown, the lock handle 16 includes a pair of mutually spaced-apart ribs 156,158 extending outwardly from the body 154. Referring to FIG. 19, the ribs 156,158 are elastically inclined towards one another. For example, the angle of inclination for each rib 156,158 relative to an imaginary vertical line may be about 15°. As shown in FIGS. 22–24, each rib 156,158 is removably connected to a respective slot 150,152 of the door 14 so that the door 14 and lock handle 16 are pivotally movable together. As shown in FIG. 24, each rib 156,158 has a depth greater than the depth of the respective slot 150,152 and includes a free end portion having an elastic protuberance 162 thereon. Each protuberance 162 has a relaxed external shape larger than its respective slot 150,152 of the door 14. Each protuberance 162 is operable to i) elastically deform and frictionally slide through the respective slot 150,152 during connection of the rib 156,158 in the respective slot 150,152 and ii) elastically expand to its relaxed external shape when the protuberance 162 has passed completely through the respective slot 150,152. As the ribs 156,158 pass through the respective slots 150,152, the ribs 156,158 are momentarily stretched farther apart from one another until the protuberances 162 completely pass through their respective slots 150,152. Thereafter, the elastic ribs 156,158 elastically spring back closer towards one another to further secure the lock handle 16 to the door 14. The lock handle 16 is removably positioned in the recessed surface 148 of the door 14 with each rib 156,158 extending completely through its respective slot 150,152.

Figure 18:
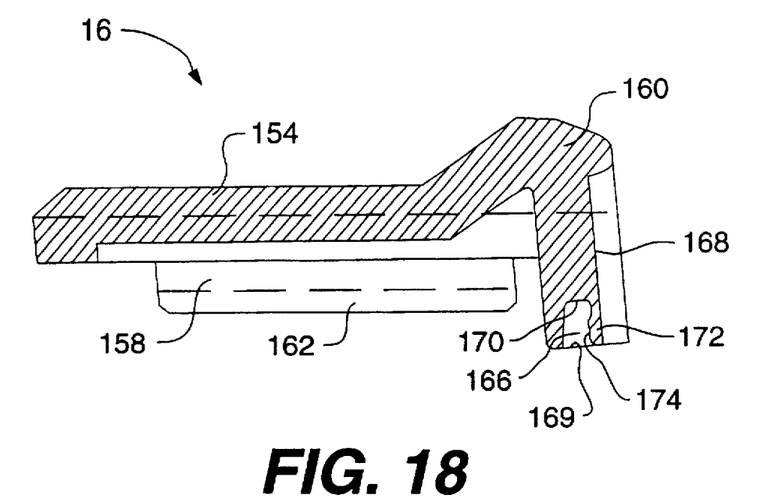
FIG. 18 is an enlarged cross-sectional view of the lock handle taken along line 18—18 of FIG. 17.

As shown in FIG. 1, the head 160 of the lock handle 16 is positioned in the notch 146 of the door 14. Referring to FIG. 18, the head 160 defines a groove 166 and an indentation or grip 168. The groove 166 selectively faces the tongue 102 of the housing 12 and the indentation 168 lies generally in the same plane as the outside surface of the top wall 24 of the housing 12.

Figure 20:
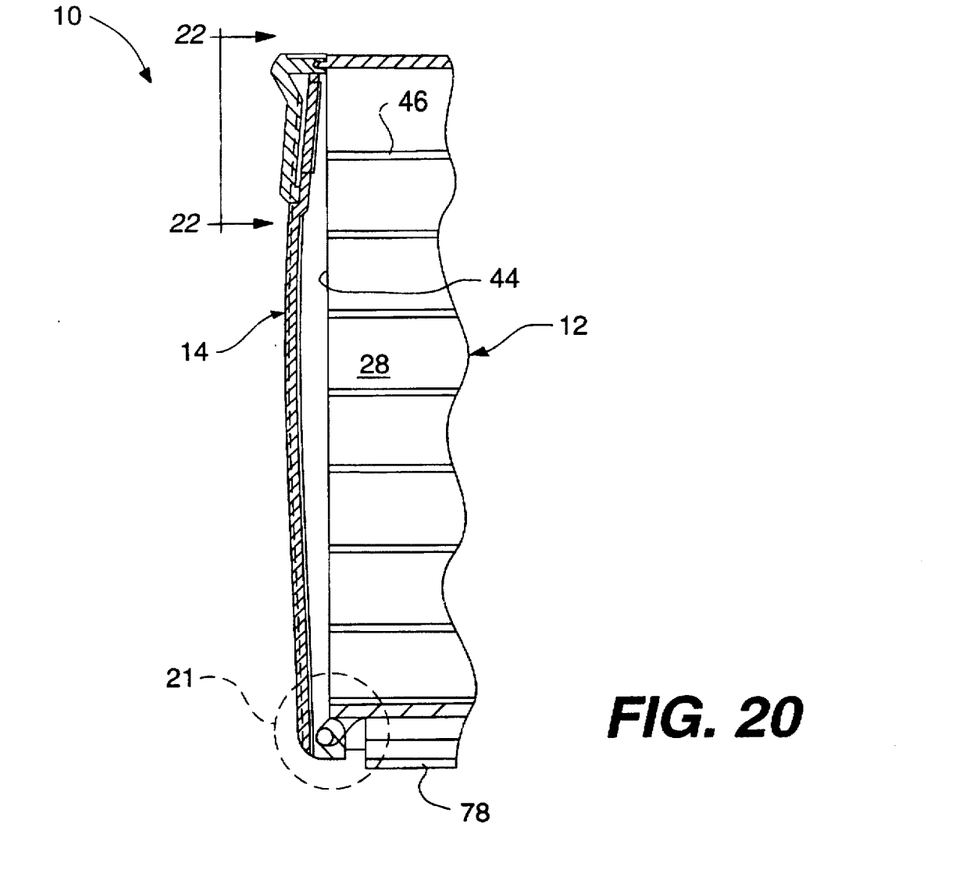
FIG. 20 is a cross-sectional partial view of the storage container assembly taken along line 20—20 of FIG. 2, showing the door at its fully-closed position.
Figure 21:
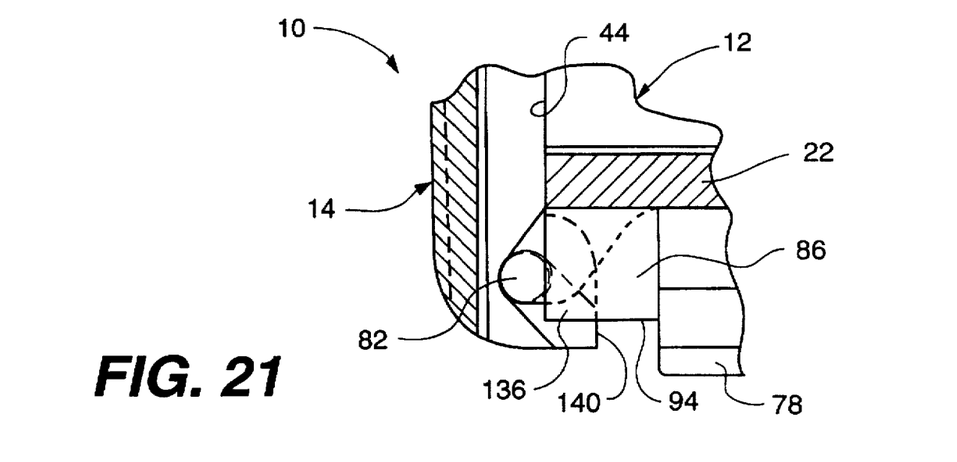
FIG. 21 is an enlarged partial view of the hinge mechanism taken within circle 21 of FIG. 20.

Referring to FIGS. 20 and 25, the groove 166 is operable to selectively i) engage the tongue 102 of the housing 12 when the door 14 and lock handle 16 are pivotally moved to their closed positions and ii) disengage the tongue 102 when the door 14 and lock handle 16 are pivotally moved towards their opened positions. Referring to FIGS. 18 and 24, the groove 166 of the lock handle 16 includes an entrance 169 and a blind cavity 170 generally conforming to the external shape of the nub 106 of the tongue 102 of the housing 12. The nub 106 is positioned in the cavity 170 of the lock handle 16 when the door 14 and lock handle 16 are pivotally moved to their closed positions. The lock handle 16 further includes an elastic throat 172 defining a restricted passage 174 in the groove 166 between the entrance 169 and the blind cavity 170. As shown in FIG. 24, the restricted passage 174 is smaller than the external shape of the nub 106 when the nub 106 is positioned in the cavity 170. The restricted passage 174 is operable to snugly latch the lock handle 16 and door 14 to the housing 12 when the nub 106 is positioned in the cavity 170. The nub 106 of the housing 12 is also operable to elastically enlarge the restricted passage 174 of the lock handle 16 and frictionally slide therethrough when the door 14 and lock handle 16 are pivotally moved between their closed and opened positions.

In operation, items such as electronic media in the form of conventional compact discs (not shown), are attached to conventional trays (not shown) and slidably stored on respective pairs of racks 46 of the storage chamber 28. In order to selectively access or close the storage chamber 28, the door 14 is selectively snapped open or shut in response to the application of a predetermined relatively small force. Such force may be manually applied with one hand, or even a single finger, on the door 14 or indentation 168 of the lock handle 16. Such snap action occurs as the restricted passage 174 of the relatively soft lock handle 16 elastically passes over the relatively rigid enlarged nub 106 of the tongue 102 of the housing 12. The force required to open or close the door 14 is chosen to be sufficiently small so as not to cause tipping or displacement of the entire storage container assembly 10 yet is of a sufficient magnitude to provide excellent holding capability. Such single finger or one-handed actuation of the door 14 requires little effort and causes minimal distraction to the performance of primary tasks as previously mentioned. After the door 14 is cracked open, the force of gravity can pull the door 14 pivotally down to its fully-opened position.

As shown in FIGS. 25–26, the shoulders 140 of the lugs are each operable to contact the outside surface of the bottom wall 22 of the housing 12 and thereby limit pivotal displacement of the door 14 when the door is pivotally displaced a predetermined angle A away from the frame 42 of the housing 12. Likewise, the abutments 94 of the stops are each operable to contact the inside surface of the door 14, and thereby limit pivotal displacement of the door 14 when the door 14 is pivotally displaced the angle A away from the frame 42 of the housing 12. In the embodiment shown, the angle A is about 90°. The angle A is sufficiently large to advantageously allow access to a tray or item positioned directly on the inside surface of the bottom wall 22, thereby maximizing usable space in the storage chamber 28. The angle A is also sufficiently small to advantageously prevent the opened door 14 from obstructing access to a storage chamber of another storage container assembly (not shown) which may be stacked below.

The storage container assembly 10 of the present invention has other advantages over typical storage containers presently available. It consists of a few lightweight components which are simple and inexpensive to assemble without the use of tools or fasteners. Moreover, the latching and unlatching operation of the door 14 is substantially noiseless.

While the storage container assembly 10 is shown as generally rectangular in shape in elevation, it will be understood that it can be generally square or more elongated in either the horizonal or vertical dimension depending upon the size, shape, and quantity of items to be stored therein. Also, the width of the storage container assembly 10 may be varied according to the thickness of the items being stored.

The storage container assembly 10 of the present invention has numerous applications such as the storage of floppy disks in any of the standard, mini, or micro sizes, the storage of compact audio disks, optical laser disks, audio cassette tapes, video cassette tapes and the like. Also, with appropriate dimensioning, the storage container assembly 10 may be used to store phonograph records.

Although the storage container assembly 10 is particularly adapted for storing electronic media, it will be appreciated that the storage container assembly 10 may be advantageously employed for storing other items as well, such as jewelry, baseball cards, and the like.

Other aspects, objects, and advantages of this invention can be obtained from a study of the drawings, the disclosure, and the appended claims.

I claim:

1. A storage container assembly, comprising:

a housing defining a storage chamber and having an integrally-formed frame defining an opening to said storage chamber, said frame having a tongue extending outwardly therefrom;

a door pivotally connected to the housing and pivotally movable between i) a closed position at which the door abuts the frame and covers said opening of the storage chamber and ii) an opened position at which the door is pivotally displaced from the frame and uncovers said opening of the storage chamber, said door defining at least one slot; and a monolithic elastomeric lock handle defining a groove having an entrance and including at least one integrally-formed outwardly-extending rib, said rib of the lock handle removably connected to said slot of the door so that the door and lock handle are pivotally movable together, said groove of the lock handle operable to selectively i) engage the tongue of the housing when the door and lock handle are firmly attached and pivotally moved to their closed positions and ii) disengage said tongue when the door and lock handle are pivotally moved towards their opened positions.

2. The storage container assembly of claim 1, wherein said tongue of the housing includes an enlarged nub thereon, said groove of the lock handle includes a blind cavity generally conforming to the external shape of the nub, said nub of the housing is positioned in the cavity of the lock handle when the door and lock handle are pivotally moved to their closed positions, said lock handle further including an elastic throat defining a restricted passage located in the groove between said entrance and said blind cavity, said restricted passage being smaller than the external shape of the nub when said nub is positioned in the cavity, said restricted passage operable to latch the lock handle and door to the housing when said nub is positioned in the cavity, said nub of the housing operable to elastically enlarge the restricted passage of the lock handle and frictionally slide therethrough when the door and lock handle are pivotally moved between their closed and opened positions.

3. The storage container assembly of claim 1, wherein said door includes a recessed surface defining said at least one slot, said lock handle removably positioned on said recessed surface with the rib extending into the slot.

4. The storage container assembly of claim 1, wherein said elastomeric lock handle is formed of a low durometer, low linear density, material selected from the group of elastomers and elastoplastics.

5. The storage container assembly of claim 4, wherein said material of the lock handle is santoprene.

6. The storage container assembly of claim 5, wherein said housing and door are each formed of a high impact thermoplastic polymer material.

7. The storage container assembly of claim 6, wherein said material of the housing and door are each selected from the group of acrylonitrile-butadiene-styrene (ABS), polystyrene, polymethyl methacrylate, high density polyethylene, and polycarbonate terephthalate.

8. The storage container assembly of claim 1, wherein said housing includes a pair of integrally-formed spaced-apart pivot pins and at least one stop positioned between the pivot pins, said stop having an abutment, said door including a pair of integrallyformed spaced-apart lugs, said lugs operable to elastically stretch over the pivot pins during assembly of the door to the housing, each lug defining a blind bore which slideably receives a respective pivot pin of the housing, said abutment of the housing operable to contact the inner surface of the door and thereby limit pivotal displacement of the door away from the frame of the housing when said door is pivotally displaced a predetermined angle away from the frame.

9. The storage container assembly of claim 8, wherein said predetermined angle is about 90°.

10. The storage container assembly of claim 8, wherein each lug of the door includes a furrow intersecting said respective blind bore, each furrow operable to pilot a respective pivot pin of the housing into the respective blind bore.

11. The storage container of claim 8, wherein each lug of the door includes a shoulder operable to contact the housing and thereby also limit pivotal displacement of the door away from the frame of the housing when said door is pivotally displaced said predetermined angle away from the frame.

12. A storage container assembly, comprising:

a housing defining a storage chamber and having an integrally-formed frame defining an opening to said storage chamber, said frame having a tongue extending outwardly therefrom:

a door pivotally connected to the housing and pivotally movable between i) a closed position at which the door abuts the frame and covers said opening of the storage chamber and ii) an opened position at which the door is pivotally displaced from the frame and uncovers said opening of the storage chamber, said door defining at least one slot:

a monolithic elastomeric lock handle defining a groove having an entrance and including at least one integrally-formed outwardly-extending rib, said rib of the lock handle removably connected to said slot of the door so that the door and lock handle are pivotally movable together, said groove of the lock handle operable to selectively i) engage the tongue of the housing when the door and lock handle are pivotally moved to their closed positions and ii) disengage said tongue when the door and lock handle are pivotally moved towards their opened positions: and said slot of the door extends completely through the door, said rib having a depth greater than the depth of said slot and including a free end portion having an elastic protuberance thereon, said protuberance having a relaxed external shape larger than the slot of the door, said protuberance operable to i) elastically deform and frictionally slide through the slot during connection of the rib in the slot and ii) elastically expand to its relaxed external shape when said protuberance has passed completely through the slot.

13. The storage container assembly of claim 12, wherein said at least one rib of the lock handle is a pair of spaced-apart ribs elastically inclined towards one another, and wherein said at least one slot of the door is a pair of spaced-apart slots, each slot receiving the respective rib.

14. A storage container assembly, comprising:

a housing defining a storage chamber and having an integrally-formed frame defining an opening to said storage chamber, said frame having a tongue extending outwardly therefrom;

a door pivotally connected to the housing and pivotally movable between i) a closed position at which the door abuts the frame and covers said opening of the storage chamber and ii) an opened position at which the door is pivotally displaced from the frame and uncovers said opening of the storage chamber, said door defining at least one slot;

a monolithic elastomeric lock handle defining a groove having an entrance and including at least one integrally-formed outwardly-extending rib, said rib of the lock handle removably connected to said slot of the door so that the door and lock handle are pivotally movable together, said groove of the lock handle operable to selectively i) engage the tongue of the housing when the door and lock handle are pivotally moved to their closed positions and ii) disengage said tongue when the door and lock handle are pivotally moved towards their opened positions;

said housing includes a pair of integrally-formed spaced-apart pivot pins and at least one stop positioned between the pivot pins, said stop having an abutment, said door including a pair of integrally-formed spaced-apart lugs, said lugs operable to elastically stretch over the pivot pins during assembly of the door to the housing, each lug defining a blind bore which slideably receives a respective pivot pin of the housing, said abutment of the housing operable to contact the door and thereby limit pivotal displacement of the door away from the frame of the housing when said door is pivotally displaced a predetermined angle away from the frame;

each lug of the door includes a shoulder operable to contact the housing and thereby also limit pivotal displacement of the door away from the frame of the housing when said door is pivotally displaced said predetermined angle away from the frame; and said at least one stop is a pair of spaced-apart stops each having an abutment operable to contact the door and thereby limit pivotal displacement of the door away from the frame of the housing when said door is pivotally displaced said predetermined angle away from the frame.

15. The storage container assembly of claim 14, wherein said housing further includes a bottom wall and a pair of integrally-formed legs extending from the bottom wall, each stop forming a partial extension of a respective leg and located between said respective leg and a plane containing the frame.

* * * * *